(12) United States Patent
Kataoka et al.

(10) Patent No.: US 10,348,007 B2
(45) Date of Patent: Jul. 9, 2019

(54) OPTICAL CONTROL ELEMENT MODULE

(71) Applicant: Sumitomo Osaka Cement Co., Ltd, Tokyo (JP)

(72) Inventors: Toshio Kataoka, Tokyo (JP); Kei Katou, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/906,511

(22) Filed: Feb. 27, 2018

(65) Prior Publication Data

US 2018/0287274 A1    Oct. 4, 2018

(30) Foreign Application Priority Data

Mar. 30, 2017  (JP) ................ 2017-069243

(51) Int. Cl.
*H01R 12/52* (2011.01)
*G02B 6/42* (2006.01)
*G02F 1/01* (2006.01)

(52) U.S. Cl.
CPC .......... *H01R 12/52* (2013.01); *G02B 6/4274* (2013.01); *G02B 6/4279* (2013.01); *G02F 1/011* (2013.01); *G02B 6/4281* (2013.01); *G02F 2201/12* (2013.01)

(58) Field of Classification Search
None
See application file for complete search history.

(56) References Cited

U.S. PATENT DOCUMENTS

| 8,712,195 B2 | 4/2014 | Sugiyama |  |
|---|---|---|---|
| 2018/0180908 A1* | 6/2018 | Katou | G02F 1/0305 |

FOREIGN PATENT DOCUMENTS

| JP | 2012048121 A | 3/2012 |
| JP | 2014195061 A | 10/2014 |

* cited by examiner

*Primary Examiner* — Michelle R Connelly
(74) *Attorney, Agent, or Firm* — Greer, Burns & Crain, Ltd.

(57) ABSTRACT

There is provided an optical control element module including: an optical control element having an optical waveguide and a control electrode on a substrate and disposed in a housing; an electrical connection part which is electrically connected to the control electrode, extends along a direction intersecting a plane on which the control electrode of the substrate is disposed, and is disposed in the housing; and a wiring substrate which has an input signal line electrically connected to the electrical connection part, at least a part of which is disposed outside the housing, in which impedance of the electrical connection part is set to be smaller than impedance of the input signal line.

6 Claims, 4 Drawing Sheets

OPTICAL CONTROL ELEMENT MODULE

CROSS-REFERENCE TO RELATED APPLICATIONS

This application claims the benefit of Japanese Patent Application No. 2017-069243 filed Mar. 30, 2017, the disclosure of which is herein incorporated by reference in its entirety.

BACKGROUND OF THE INVENTION

Field of the Invention

The present invention relates to an optical control element module and in particular to an optical control element module in which an electrical connection part is provided between an optical control element disposed in a housing and a wiring substrate, at least apart of which is disposed outside the housing, to electrically connect the optical control element and the wiring substrate, and the electrical connection part extends along a direction intersecting a plane on which a control electrode of the optical control element is disposed.

Description of Related Art

In the optical communication field, an optical transmitter and receiver using an optical control element such as an optical modulator is used. In recent years, due to a demand for downsizing of an optical transmission system, there has also been a trend toward shortening of an RF interface connection which is an electrical interface part of an optical control element which is mounted in an optical transmitter and receiver module (a transponder).

For example, in an optical modulator or the like in a transmission format of 100G dual polarization quadrature phase shift keying (DP-QPSK), with demands for a price reduction of a market and downsizing of a device, with respect to the RF interface connection as well, in addition to a connection configuration using a coaxial connector of the related art, a connection configuration is adopted in which solder connection is performed using a flexible printed circuit substrate (FPC) as disclosed in Japanese Laid-open Patent Publication No. 2014-195061 or Japanese Laid-open Patent Publication No. 2012-48121.

FIG. 1 shows a state where an optical control element module is disposed on an external circuit substrate configuring an optical transmitter and receiver module. As means for realizing shortening, a wiring substrate using an FPC is used. FIG. 2 shows the state of a section taken along arrow A-A' in FIG. 1. In the optical control element module, an optical control element is housed in a metallic housing and hermetically sealed. The optical control element housed in the housing and the external circuit substrate are electrically connected to each other via the wiring substrate which is the FPC, and a lead pin which is disposed in a through-hole of the housing. The lead pin is indicated as an "electrical connection part" in the drawing. Further, the wiring substrate and the lead pin are directly connected to each other. The lead pin and the optical control element are wire-bonded to each other with an electric wire such as a gold wire.

Next, FIG. 3 is a sectional view showing an example in which a relay substrate is disposed between the optical control element and the electrical connection part. A glass lead pin is frequently used for the electrical connection part shown in FIG. 2 or 3 in order to secure the reliability of hermetic sealing.

Further, for example, a ceramic material such as alumina is used for the relay substrate. In the glass lead pin, as shown in FIG. 4, an insulating material C such as a glass material is disposed so as to surround a center conductor S3, and a conductor G is disposed on the outside of the insulating material C. In the related art, the glass lead pin is designed so as to always have constant impedance, for example, 50Ω.

On the other hand, in the optical control element such as an optical modulator, a substrate having an electro-optic effect, such as lithium niobate, is used, and in order to deal with a wider bandwidth or a lower drive voltage, devisal such as thinning a substrate, increasing the thickness of an electrode, or narrowing the gap between a signal electrode and a ground electrode has been performed. However, in a case of adopting such a configuration, the characteristic impedance of the optical control element is reduced to a range of about 20 to 40Ω.

An input signal such as a modulation signal is introduced from the external circuit substrate to the wiring substrate such as the FPC. However, since the input impedance of the wiring substrate such as the FPC is usually 50Ω, mismatch occurs between the characteristic impedance of the wiring substrate such as the FPC and the characteristic impedance of the optical control element. In the related art, in order to suppress reflection of microwaves due to the impedance mismatch, a transmission line for impedance adjustment is formed in a control electrode S1 of the optical control element or wiring S2 of the relay substrate.

However, if the transmission line for impedance adjustment is formed on the optical control element or the relay substrate, a new problem such as making it difficult to downsize the optical control element or the optical control element module with the optical control element incorporated therein arises.

SUMMARY OF THE INVENTION

An object of the present invention is to solve the problem as described above and provide an optical control element module in which it is also possible to realize the downsizing of the entire optical control element module while improving an electroreflection characteristic due to mismatch between the input impedance of an input signal and the characteristic impedance of an optical control element.

In order to achieve the above object, an optical control element module according to the present invention has the following technical features.

(1) An optical control element module includes: an optical control element having an optical waveguide and a control electrode on a substrate and disposed in a housing; an electrical connection part which is electrically connected to the control electrode, extends along a direction intersecting a plane on which the control electrode of the substrate is disposed, and is disposed in the housing; and a wiring substrate which has an input signal line electrically connected to the electrical connection part, at least a part of which is disposed outside the housing, in which impedance of the electrical connection part is set to be smaller than impedance of the input signal line.

(2) In the optical control element module according to the above (1), the electrical connection part is formed of a lead pin.

(3) In the optical control element module according to the above (2), a diameter of an outer sheath conductor of the lead pin varies along an extension direction of the lead pin.

(4) In the optical control element module according to any one of the above (1) to (3), the impedance of the electrical connection part is 50Ω or less.

(5) In the optical control element module according to any one of the above (1) to (4), the optical control element module further includes: a relay substrate having a relay signal line which electrically connects the control electrode and the electrical connection part to each other, in which a plane on which the relay signal line of the relay substrate is disposed is parallel to a plane on which the control electrode of the substrate is disposed.

(6) In the optical control element module according to any one of the above (1) to (5), the wiring substrate is a flexible printed circuit substrate.

According to the present invention, in the optical control element module including: an optical control element having an optical waveguide and a control electrode on a substrate and disposed in a housing; an electrical connection part which is electrically connected to the control electrode, extends along a direction intersecting a plane on which the control electrode of the substrate is disposed, and is disposed in the housing; and a wiring substrate which has an input signal line electrically connected to the electrical connection part, at least a part of which is disposed outside the housing, the impedance of the electrical connection part is set to be smaller than the impedance of the input signal line, and therefore, it also becomes possible to realize the downsizing of the entire optical control element module while improving an electroreflection characteristic due to mismatch between the input impedance of an input signal and the characteristic impedance of the optical control element.

DETAILED DESCRIPTION OF THE INVENTION

Hereinafter, an optical control element module according to the present invention will be described in detail using preferred examples.

Figure 1:
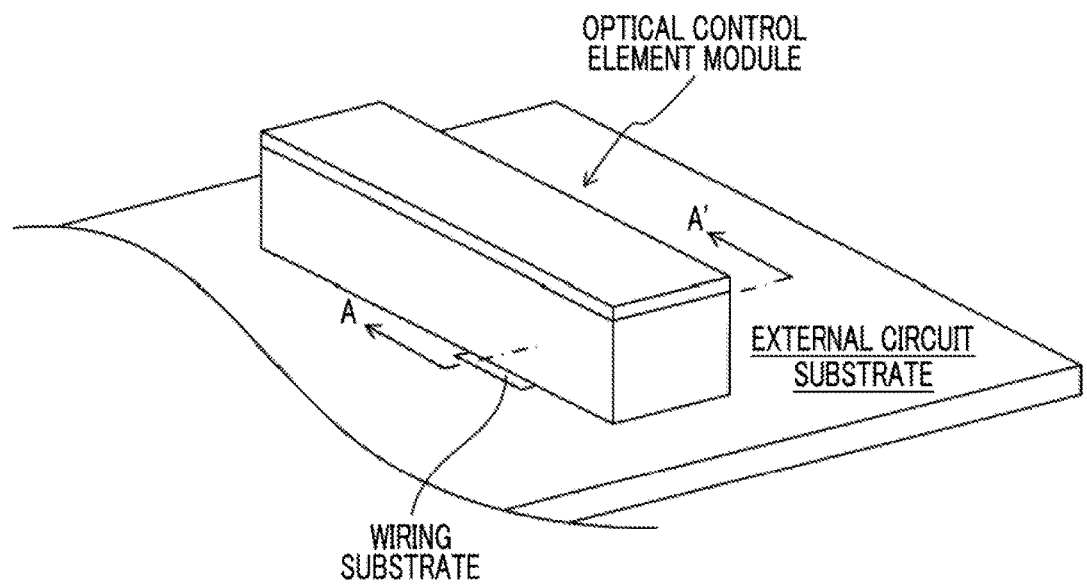
FIG. 1 is a diagram showing a state where an optical control element module is disposed on an external circuit substrate.
Figure 2:
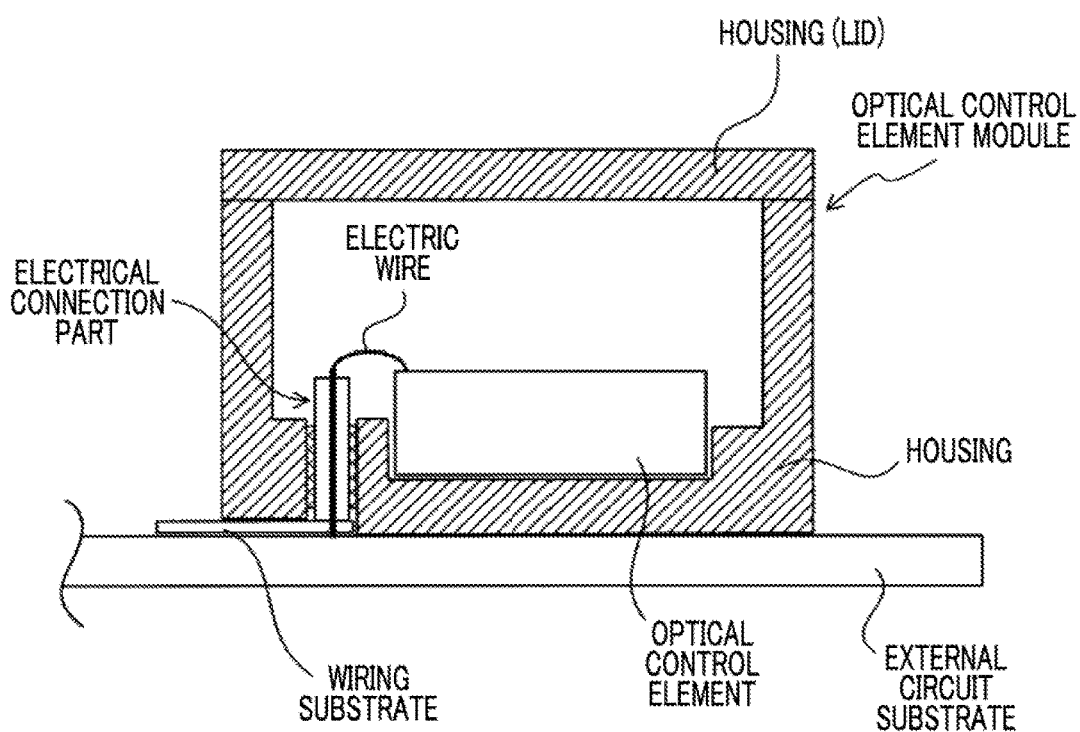
FIG. 2 is a diagram showing a sectional view taken along dashed-dotted line A-A' in FIG. 1.
Figure 3:
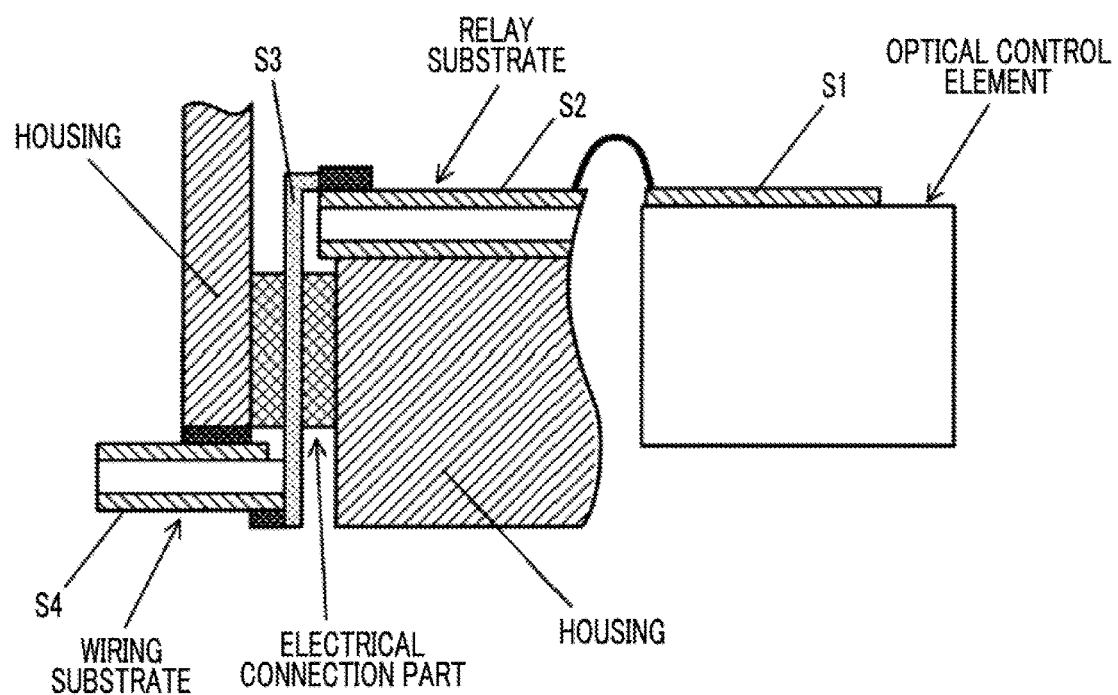
FIG. 3 is a diagram showing a part of a section of an optical control element module in which a relay substrate is disposed in a housing.

As shown in FIG. 2 or 3, the optical control element module according to the present invention includes: an optical control element having an optical waveguide and a control electrode (S1) on a substrate and disposed in a housing; an electrical connection part (S3) which is electrically connected to the control electrode, extends along a direction intersecting a plane on which the control electrode of the substrate is disposed, and is disposed in the housing; and a wiring substrate which has an input signal line (S4) electrically connected to the electrical connection part, at least a part of which is disposed outside the housing, in which the impedance of the electrical connection part is set to be smaller than the impedance of the input signal line.

In FIG. 2, a relay substrate is not used. However, as shown in FIG. 3, it is also possible to use a relay substrate provided with a relay signal line S2 which electrically connects the control electrode S1 and the electrical connection part S3 to each other. Usually, the plane (a plane perpendicular to the paper surface including a left-right direction in FIG. 3) on which the relay signal line S2 of the relay substrate is disposed is disposed so as to be parallel to the plane (the same as the above description) on which the control electrode S1 of the substrate configuring the optical control element is disposed. In this way, the electrical connection between the optical control element and the relay substrate is facilitated and a reduction in the propagation loss of an electric signal is attained.

A feature of the present invention is that, when an input signal is transmitted from the wiring substrate (an input signal line) to the optical control element (a control electrode), an electrical connection part is provided in the middle of a line which electrically connects the wiring substrate and the optical control element, as shown in FIG. 2 or 3. Then, the electrical connection part extends along a direction (an up-down direction in FIG. 2 or 3) intersecting the plane (the plane perpendicular to the paper surface including the left-right direction in FIG. 2 or 3) on which the control electrode of the substrate configuring the optical control element is disposed.

Figure 4:
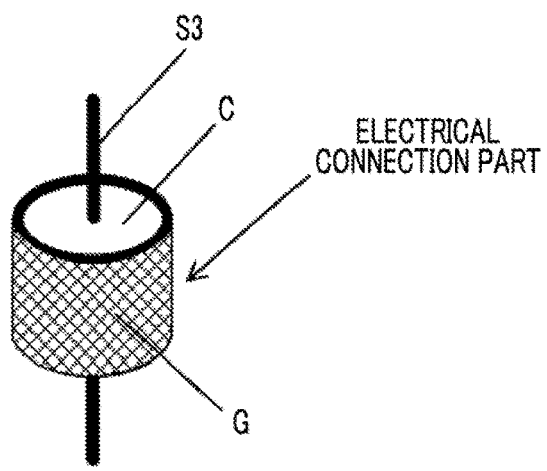
FIG. 4 is a schematic diagram of a lead pin which is used for an electrical connection part of FIG. 2 or 3.
Figure 5:
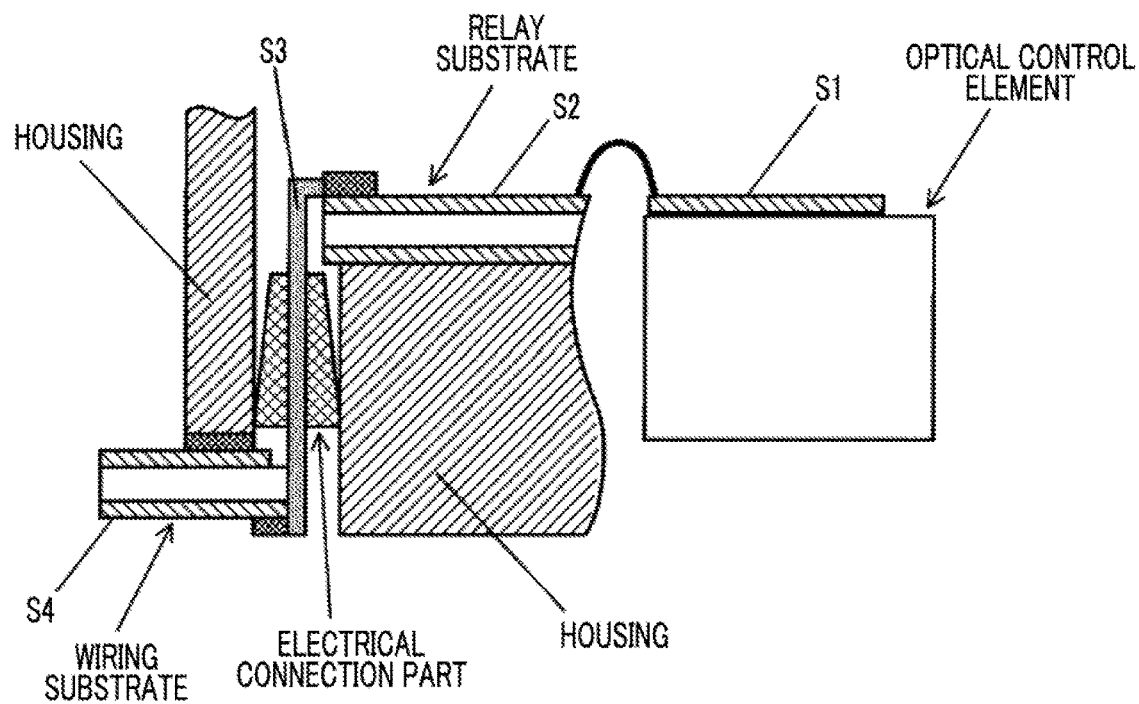
FIG. 5 is a sectional view for explaining another example relating to an optical control element module according to the present invention.
Figure 6:
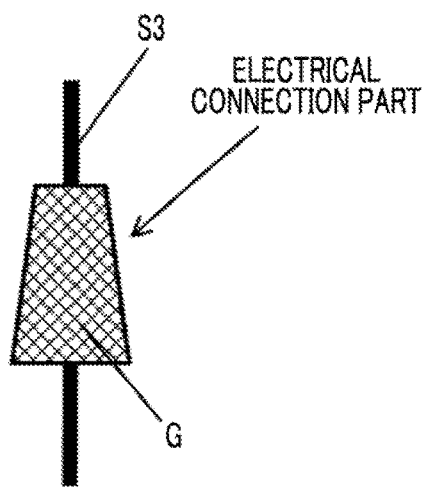
FIG. 6 is a side view of a lead pin which is used in the example of FIG. 5.
Figure 7:
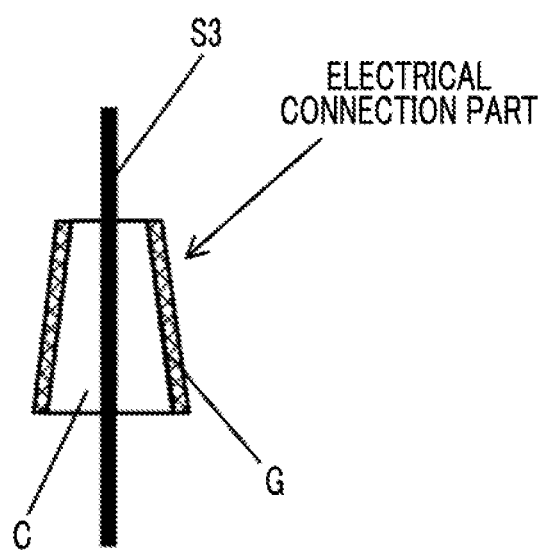
FIG. 7 is a sectional view of the lead pin of FIG. 6.

The electrical connection part is composed of an insulating material (C) surrounding a signal line (S3), such as a glass lead pin shown in FIG. 4, and an electrically conductive outer sheath (G) surrounding the insulating material. The outer shape of the electrical connection part is not limited to a columnar shape as shown in FIG. 4 and may be a rectangular column shape. Further, as shown in FIGS. 5 to 7 (described later), a truncated cone shape or a truncated pyramid shape can also be adopted. As the insulating material (C), glass is mainly used. However, any material can be used as long as it is a highly insulating material such as ceramic.

The optical control element is configured by incorporating an optical waveguide or a control electrode into a substrate formed of a substrate material having an electro-optic effect, such as lithium niobate, or a semiconductor material. In a case of using a high-frequency input signal such as a microwave, in order to achieve matching (velocity matching) of the propagation speed of the microwave and the propagation speed of light, devisal such as thinning the thickness of the substrate to 20 μm or less or forming the control electrode to be thick to several tens of μm or more is performed. Further, in order to lower the drive voltage of an input signal, narrowing the gap between a signal electrode and a ground electrode configuring the control electrode is also performed.

The characteristic impedance of the optical control element devised as described above is lower than 50Ω which is a conventional value, and shows a value in a range of about 20 to 40Ω. On the other hand, the input impedance of an input signal line (S4) which is disposed on the outside is conventionally 50Ω. For this reason, impedance mismatch occurs between the input impedance of the input signal line (S4) and the characteristic impedance of the optical control element. In order to solve this problem, it is necessary to provide a transmission line for impedance adjustment.

In the present invention, the transmission line for impedance adjustment is made by an electrical connection part such as a lead pin. For example, in the optical control element module of FIG. 2, in a case where the characteristic impedance of the optical control element is 25Ω and the input impedance of the wiring substrate which is connected to an external drive circuit is 50Ω, about 35.4Ω which is the geometric mean value of the respective characteristic impedances may be used as the characteristic impedance of the electrical connection part.

In a case where the electrical connection part having characteristic impedance of about 35.4Ω is configured of a columnar glass lead pin as shown in FIG. 4, if the relative dielectric constant of the insulating material (C) is set to be 4, the outer diameter of a center conductor (S3) is 0.3 mm and the inner diameter of the outer sheath conductor (G) (the outer diameter of the insulating material) is 0.98 mm.

In a case where the impedance of the electrical connection part is 50Ω, the inner diameter of the outer sheath conductor (G) (the outer diameter of the insulating material) is about 1.5 mm.

That is, if the outer diameter of the center conductor (S3), the relative dielectric constant of the insulating material (C), and the thickness of the outer sheath conductor (G) are the same, the smaller the characteristic impedance becomes, the smaller the outer diameter of the glass lead pin becomes.

In other words, the outer diameter of the glass lead pin affects the housing size of the optical control element module, and therefore, by providing the transmission line for impedance adjustment in the electrical connection part, it is possible to reduce the housing size.

In the above example, it is possible to reduce the housing size by 0.52 mm which is the difference between the inner diameter of the outer sheath conductor (G) (the outer diameter of the insulating material), 0.98 mm, in a case where the characteristic impedance is about 35.4Ω, and the inner diameter, 1.5 mm, of the outer sheath conductor (G) in a case where the characteristic impedance is 50.

In a configuration in which the relay substrate is used as shown in FIG. 3, in a case where the characteristic impedance of the relay substrate is set to be the same as the characteristic impedance of the optical control element, the characteristic impedance of the electrical connection part is set to about 35.4Ω, similar to the case of FIG. 2. Further, the transmission line for impedance adjustment can also be used for the relay substrate, in addition to the electrical connection part. For example, in order to perform the impedance adjustment with the optical control element set to be 25Ω and the wiring substrate set to be 50Ω, the characteristic impedance of the relay substrate is set to about 31.5Ω and the characteristic impedance of the electrical connection part is set to about 39.7Ω. With respect to the dimensions of the electrical connection part at this time, for example, in a case where an insulating material having a relative dielectric constant of 4 is used, the outer diameter of the center conductor (S3) is 0.2 mm and the inner diameter of the outer sheath conductor (G) (the outer diameter of the insulating material) is 0.75 mm.

Also in such a configuration, the outer diameter of the glass lead pin can be reduced compared to a case where the characteristic impedance of the electrical connection part is 50Ω, and therefore, it is possible to reduce the housing size.

Further, as shown in FIGS. 5 to 7, it is also possible to make a configuration such that the characteristic impedance of the electrical connection part changes continuously. Providing a portion where impedance changes continuously in the transmission line for impedance adjustment makes it possible to further improve an electroreflection characteristic due to impedance mismatch.

In the electrical connection part of FIG. 5, a truncated cone-shaped glass lead pin is used. FIG. 6 is a side view of the lead pin, and FIG. 7 is a sectional view of the lead pin. For example, in a case where the characteristic impedance of the optical control element of FIG. 3 is set to 25Ω, the characteristic impedance of the relay substrate is set to about 31.5Ω, and the input impedance of the wiring substrate is set to 50Ω, the characteristic impedance of the electrical connection part is set so as to continuously change from about 50Ω to about 39.6Ω. In this case, in the dimensions of the truncated cone-shaped lead pin shown in FIG. 6 and FIG. 7, assuming that the outer diameter of the center conductor (S3) is 0.2 mm at the relative dielectric constant of the insulating material of 4, the inner diameter of the outer sheath conductor (G) (the outer diameter of the insulating material) at a lower base of the truncated cone is about 1.05 mm and the diameter of an upper base is about 0.75 mm.

Also in such a configuration, the outer diameter of the glass lead pin can be reduced compared to a case where the characteristic impedance of the electrical connection part is 50Ω, and therefore, it is possible to reduce the housing size.

The truncated cone-shaped electrical connection part of FIG. 5 can, of course, be applied to configuration of FIG. 2. It is also possible to set a change in the impedance of the truncated cone so as to continuously change from the input impedance of the wiring substrate to the characteristic impedance of the optical control element or the relay substrate.

The wiring substrate is configured of a flexible printed circuit substrate, as shown in Japanese Laid-open Patent Publication No. 2014-195061 or Japanese Laid-open Patent Publication No. 2012-48121. Further, in the above description, the input impedance of the wiring substrate is set to 50Ω which is the same as that of the external drive circuit. However, it is also possible to add a configuration for impedance adjustment in the middle of the input signal line of the wiring substrate. Even in the case, it is preferable that the entire impedance adjustment including the characteristic impedance of the electrical connection part is performed.

As described above, according to the present invention, it is possible to provide an optical control element module in which it is also possible to realize the downsizing of the entire optical control element module while improving an electroreflection characteristic due to mismatch between the input impedance of an input signal and the characteristic impedance of an optical control element.

What is claimed is:

1. An optical control element module comprising:
   an optical control element having an optical waveguide and a control electrode on a substrate and disposed in a housing;
   an electrical connection part which is electrically connected to the control electrode, extends along a direction intersecting a plane on which the control electrode of the substrate is disposed, and is disposed in the housing; and
   a wiring substrate which has an input signal line electrically connected to the electrical connection part, at least a part of which is disposed outside the housing,
   wherein an impedance of the electrical connection part is set to be smaller than an impedance of the input signal line of the wiring substrate and greater than a characteristic impedance of the optical control element.

2. The optical control element module according to claim 1, wherein the electrical connection part is formed of a lead pin.

3. The optical control element module according to claim 2, wherein a diameter of an outer sheath conductor of the lead pin varies along an extension direction of the lead pin.

4. The optical control element module according to claim 1, wherein the impedance of the electrical connection part is less than 50Ω.

5. The optical control element module according to claim 1, further comprising:
   a relay substrate having a relay signal line which electrically connects the control electrode and the electrical connection part, wherein a plane on which the relay signal line of the relay substrate is disposed is parallel to a plane on which the control electrode of the substrate is disposed.

6. The optical control element module according to claim 1, wherein the wiring substrate is a flexible printed circuit substrate.

* * * * *